United States Patent
Heo et al.

(10) Patent No.: US 8,352,694 B2
(45) Date of Patent: Jan. 8, 2013

(54) METHOD OF CONTROLLING MEMORY ACCESS

(75) Inventors: Sung-kwan Heo, Seoul (KR); Chan-ju Park, Suwon-si (KR); Sang-bum Suh, Seoul (KR); Joo-young Hwang, Suwon-si (KR); Jae-min Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 965 days.

(21) Appl. No.: 12/056,438

(22) Filed: Mar. 27, 2008

(65) Prior Publication Data

US 2008/0244206 A1    Oct. 2, 2008

(30) Foreign Application Priority Data

Mar. 30, 2007 (KR) .................. 10-2007-0031947

(51) Int. Cl.
*G06F 12/06* (2006.01)

(52) U.S. Cl. ............... 711/163; 711/206; 711/E12.065; 711/147

(58) Field of Classification Search .............. 711/203, 711/147, E12.065, 202, 163; 718/1, 100, 718/102

See application file for complete search history.

(56) References Cited

U.S. PATENT DOCUMENTS

| | | | |
|---|---|---|---|
| 5,522,075 A | 5/1996 | Robinson et al. | |
| 6,631,472 B2 | 10/2003 | Kaplan et al. | |
| 7,035,963 B2 * | 4/2006 | Neiger et al. | 711/6 |
| 7,073,059 B2 * | 7/2006 | Worely, Jr. et al. | 713/168 |
| 7,213,125 B2 * | 5/2007 | de Dinechi | 711/203 |
| 7,277,998 B1 * | 10/2007 | Agesen et al. | 711/163 |
| 7,278,030 B1 * | 10/2007 | Chen et al. | 713/189 |
| 7,356,684 B2 | 4/2008 | Han et al. | |
| 7,506,122 B1 * | 3/2009 | Agesen et al. | 711/163 |
| 2002/0194389 A1 * | 12/2002 | Worley, Jr. et al. | 709/310 |
| 2004/0078631 A1 | 4/2004 | Rogers et al. | |
| 2004/0205203 A1 * | 10/2004 | Peinado et al. | 709/229 |
| 2005/0081212 A1 | 4/2005 | Goud et al. | |

(Continued)

FOREIGN PATENT DOCUMENTS

KR    2003-0003945 A    1/2003

(Continued)

*Primary Examiner* — Pierre-Michel Bataille
(74) *Attorney, Agent, or Firm* — Sughrue Mion, PLLC

(57) ABSTRACT

Provided is a method of controlling memory access. In a system including a first layer element executed in a privileged mode having a first priority of permission to access the entire region of a memory and second and third layer elements executed in an unprivileged mode having a second priority of permission to access a partial region of the memory, the method of controlling memory access determines whether the memory is accessible for each page that is an address space unit, based on which mode a layer element currently accessing the memory is executed in between the privileged mode and the unprivileged mode; and determines whether the memory is accessible based on which one of the first, second and third layer elements corresponds to a domain currently being attempted to be accessed from among a plurality of domains of the memory. Accordingly, a memory domain allocated to a guest operating system kernel is effectively protected from an application executed in the unprivileged mode in which the guest operating system kernel is executed.

20 Claims, 3 Drawing Sheets

U.S. PATENT DOCUMENTS

| | | |
|---|---|---|
| 2005/0223225 A1 | 10/2005 | Campbell et al. |
| 2006/0026687 A1 | 2/2006 | Peikari |
| 2006/0112212 A1 | 5/2006 | Hildner |
| 2006/0218425 A1 | 9/2006 | Ding et al. |
| 2007/0005919 A1* | 1/2007 | van Riel ................... 711/163 |
| 2007/0106986 A1* | 5/2007 | Worley ...................... 718/1 |

FOREIGN PATENT DOCUMENTS

| | | |
|---|---|---|
| KR | 10-2005-0011603 A | 1/2005 |
| KR | 10-2005-0098514 A | 10/2005 |
| KR | 10-2006-0088755 A | 8/2006 |

* cited by examiner

METHOD OF CONTROLLING MEMORY ACCESS

CROSS-REFERENCE TO RELATED PATENT APPLICATION

This application claims priority from Korean Patent Application No. 10-2007-0031947, filed on Mar. 30, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to memory access control, and more particularly, to memory access control in a system to which virtualization is applied.

2. Description of the Related Art

Virtualization is a technique that virtualizes hardware resources including processors, memories, networks, devices and graphic functions for operating systems. Most operating systems are executed on the assumption that they exclusively possess computer resources. Accordingly, it is impossible to simultaneously execute a plurality of operating systems on a single computer because a conflict between the plurality of the operating systems occurs. Virtualization provides a virtual hardware interface for an operating system between the hardware and the operating system and enables simultaneous execution of multiple operating systems on a single computer.

Even though virtualization has been developed for server consolidation, it is also applied to embedded systems, such as cellular phones, personal digital assistants (PDAs), digital multimedia broadcasting (DMB) terminals, as an essential element for implementing secure mobile devices in a third generation (3G) environment or greater.

FIG. 1 illustrates a concept of a system 10 to which a related art virtualization technique is not applied. Referring to FIG. 1, the system 10 includes hardware 11, an operating system kernel 12, and a plurality of applications 13. The operating system kernel 12 is software responsible for security access to the hardware 11 and some of the applications 13 of a computer. Since there are many applications 13 and the system resources are limited, the operating system kernel 12 must determine the time for when one of the applications 13 uses the system resources and the number of resources used by the application 13. This process is referred to as scheduling.

The operating system kernel 12 and the applications 13 share a single page table and exist in the same address space, in general. In this case, the applications 13 have to be controlled such that they cannot violate a memory domain allocated to the operating system kernel 12.

A microprocessor provides two execution modes, that is, a privileged mode and an unprivileged mode. The privileged mode enables software to perform a limited operation that operates on an important part of a system, such as a memory and an input/output device. The applications 13 cannot be executed in the privileged mode, and the operating system kernel 12 or a driver (not shown) that is used for controlling devices connected to the system can be executed in the privileged mode. That is, programs executed in the privileged mode are permitted to freely access the memory and the system resources. On the contrary, programs executed in the unprivileged mode are restrained from accessing a specific memory domain and/or a device system. Accordingly, the applications 13 are prevented from violating the memory domain of the operating system kernel 12 by making the operating system kernel 12 access a section of memory in the privileged mode and making the applications 13 access another section of the memory in the unprivileged mode.

FIG. 2 illustrates a concept of a system 20 to which the related art virtualization technique is applied. Referring to FIG. 2, the system 20 includes hardware 21, a virtual machine monitor (VMM) 22, a first guest operating system kernel 23, a second guest operating system kernel 24, a plurality of first applications 25, and a plurality of second applications 26. In this case, an environment in which the first and second guest operating system kernels 23 and 24 are executed is referred to as a virtual machine (VM).

In the case of a processor having subdivided execution modes, such as a high-performance x86 processor, access modes can be set for respective memory domains to control memory access. Specifically, a VMM mode in which the VMM 22 is executed, a VM kernel mode in which the first and second guest operating system kernels 23 and 24 are executed, and a VM user mode in which the first and second applications 25 and 26 are executed can be respectively defined.

In the case of systems only having the privileged mode and the unprivileged mode, such as embedded systems, the VMM 22 is executed in the privileged mode and the first and second guest operating system kernels 23 and 24 as well as the first and second applications 25 and 26 are executed in the unprivileged mode. In this case, the first and second guest operating system kernels 23 and 24 and the first and second applications 25 and 26 are executed in the same execution mode, and thus, the execution mode is required to be subdivided. Accordingly, the unprivileged mode is divided into a VM kernel mode in which the first and second guest operating system kernels 23 and 24 are executed and a VM user mode in which the first and second applications 25 and 26 are executed.

However, the VM kernel mode and the VM user mode have the same memory access permissions because the VM kernel mode and the VM user mode both execute in the unprivileged mode. That is, the memory domains allocated to the first and second guest operating system kernels 23 and 24 are also accessible in the VM user mode.

SUMMARY OF THE INVENTION

The present invention provides a method of controlling memory access of different layers operating in the same execution mode in a system having two execution modes.

The present invention also provides a system for protecting memory domains of different layers operating in the same execution mode when the system has two execution modes.

According to an aspect of the present invention, there is provided a method of controlling memory access in a system including a first layer element executed in a privileged mode having a first priority of permission to access an entire region of a memory and second and third layer elements executed in an unprivileged mode having a second priority of permission to access a partial region of the memory, the method comprising: determining whether the memory is accessible for each page that is an address space unit, based on which mode a layer element currently accessing the memory is executed in between the privileged mode and the unprivileged mode; and determining whether the memory is accessible based on which one of the first, second and third layer elements corresponds to a domain currently being attempted to be accessed from among a plurality of domains of the memory.

According to another aspect of the present invention, there is provided a computer readable recording medium storing a program for executing a method of controlling memory access in a system including a first layer element executed in a privileged mode having a first priority of permission to access an entire region of a memory and second and third layer elements executed in an unprivileged mode having a second priority of permission to access a partial region of the memory, the method comprising: determining whether the memory is accessible for each page that is an address space unit, based on which mode a layer element currently accessing the memory is executed in between the privileged mode and the unprivileged mode; and determining whether the memory is accessible based on which one of the first, second and third layer elements corresponds to a domain currently being attempted to be accessed from among a plurality of domains of the memory.

According to another aspect of the present invention, there is provided a system including a first layer element executed in a privileged mode having a first priority of permission to access an entire region of a memory and second and third layer elements executed in an unprivileged mode having a second priority of permission to access a partial region of the memory, the system comprising: the memory; and a processor which determines whether the memory is accessible for each page that is an address space unit based on which mode a layer element currently accessing the memory is executed in between the privileged mode and the unprivileged mode, and which determines whether the memory is accessible based on which one of the first, second and third layer elements corresponds to a domain that is currently being accessed from among a plurality of domains of the memory.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE INVENTION

Figure 1:
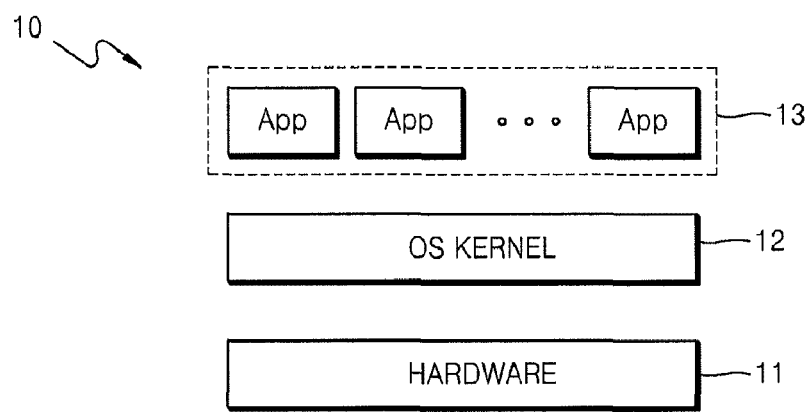
FIG. 1 illustrates a concept of a system to which a related art virtualization technique is not applied.

The present invention will now be described more fully with reference to the accompanying drawings, in which exemplary embodiments of the invention are shown. The invention may, however, be embodied in many different forms and should not be construed as being limited to the exemplary embodiments set forth herein; rather, these embodiments are provided so that this disclosure will be thorough and complete, and will fully convey the concept of the invention to those skilled in the art. Throughout the drawings, like reference numerals refer to like elements.

Figure 2:
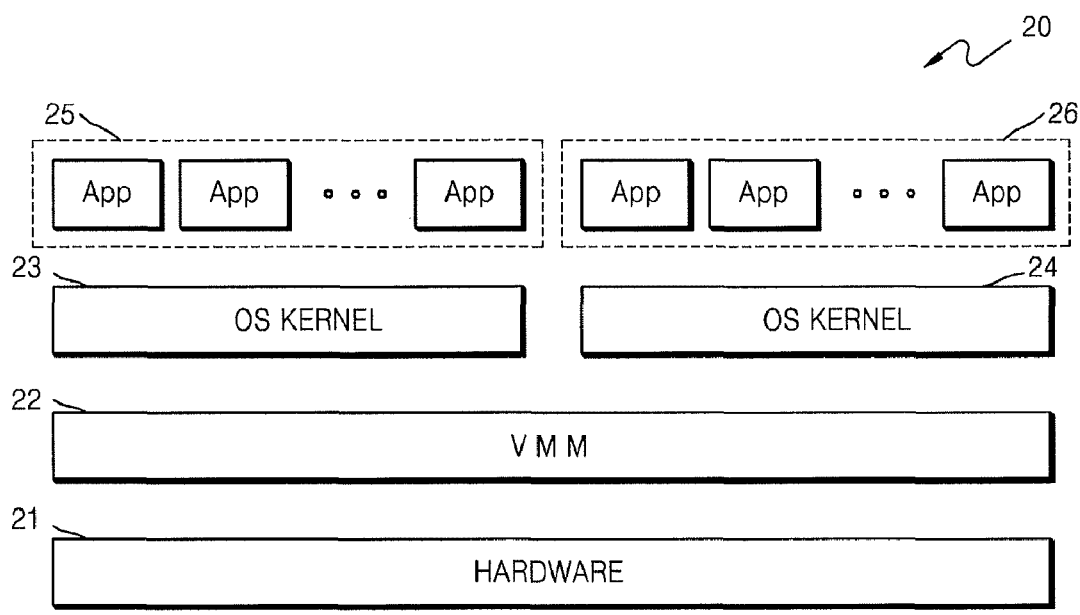
FIG. 2 illustrates a concept of a system to which the related art virtualization technique is applied.
Figure 3:
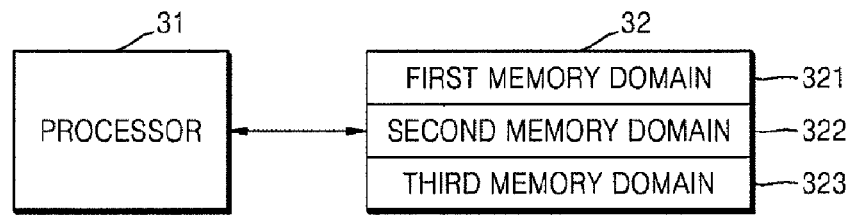
FIG. 3 is a block diagram of a system to which a virtualization technique, according to an exemplary embodiment of the present invention, is applied.

FIG. 3 is a block diagram of a system to which a virtualization technique, according to an exemplary embodiment of the present invention, is applied. As described above with reference to FIG. 2, a system to which the related art virtualization technique is applied includes hardware, at least one guest operating system kernel, at least one application, and a VMM interfacing the hardware to the at least one guest operating system kernel.

Referring to FIG. 3, the hardware of the system employing the virtualization technique, according to the present exemplary embodiment, includes a processor 31 and a memory 32. The memory 32 may include first, second and third memory domains 321, 322 and 323.

To apply the virtualization technique to the system when the processor 31 only has the privileged mode and the unprivileged mode, the processor 31 provides a virtual mode according to a currently executed process. Specifically, the processor 31 provides a first virtual mode corresponding to the privileged mode if the currently executed process is a virtual machine monitor (VMM), provides a second virtual mode corresponding to the unprivileged mode if the currently executed process is a guest operating system kernel, and provides a third virtual mode corresponding to the unprivileged mode if the currently executed process is an application. Thus, the first, second and third virtual modes can be respectively referred to as a VMM mode, a VM kernel mode and a VM user mode. The processor 31 can be a microprocessor, a digital signal processor or a microcontroller, which is able to execute software.

The memory 32 includes the first, second, and third memory domains 321, 322 and 323. The first memory domain 321 can be allocated to the VMM, the second memory domain 322 can be allocated to the guest operating system kernel, and the third memory domain 323 can be allocated to the application. The memory 32 can be a hard disk, a floppy disk, a RAM, a ROM, a flash memory, or a computer readable recording medium.

Both the VM kernel mode and the VM user mode correspond to the unprivileged mode, and thus the guest operating system kernel and the application are executed in the same mode. In this case, the application executed in the VM user mode must be prevented from accessing the second memory domain 322 allocated to the guest operating system kernel even if both the application and the guest operating system kernel are executed in the unprivileged mode.

Accordingly, an access of the currently executed process to the memory 32 must be controlled by setting memory accessibility for each page according to the execution mode of the processor 31, that is, by setting memory access permissions in a page table, and, simultaneously, setting the memory accessibility for each memory domain according to the virtual mode of the processor 31, that is, according to the currently executed process.

Figure 4:
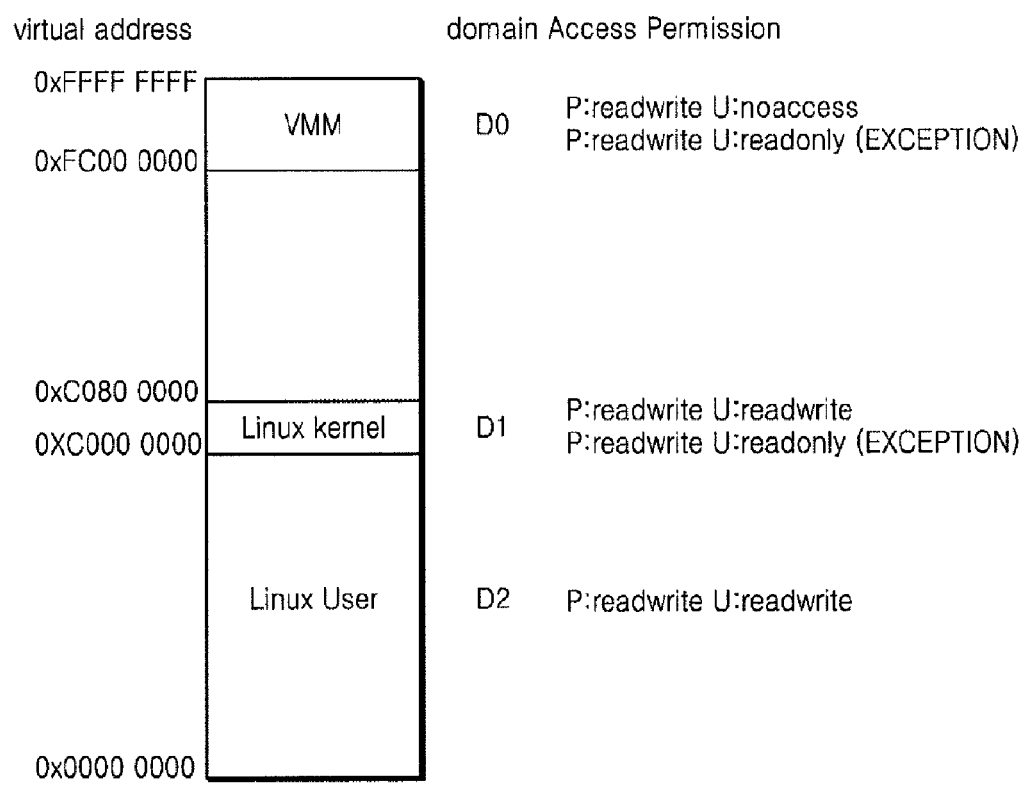
FIG. 4 illustrates virtual addresses, memory domains, and domain access permission to a page table when Linux is used as a guest operating system in a virtualization system using a processor according to an exemplary embodiment of the present invention.

FIG. 4 illustrates virtual addresses, memory domains and domain access permissions to a page table when Linux is used as a guest operating system in a virtualization system using a processor, according to an exemplary embodiment of the present invention. Referring to FIG. 4, the processor, according to an exemplary embodiment of the present invention, controls memory access permissions according to two execution modes, that is, the privileged mode and the unprivileged mode. As described above, the system employing the related art virtualization technique includes hardware, a VMM, at least one guest operating system kernel, and at least one application, see FIG. 2.

In the present exemplary embodiment, the VMM is executed in the VMM mode corresponding to the privileged mode, the guest operating system kernel is executed in the VM kernel mode corresponding to the unprivileged mode, and the application is executed in the VM user mode corresponding to the unprivileged mode. According to the present exemplary embodiment, however, the guest operating system kernel and the application are given memory access permission set in the page table for each memory domain, and thus, the guest operating system kernel and the application do not violate memory domains that are not allocated thereto and their own respective memory domains are not violated by other processes.

A memory domain corresponds to a predetermined virtual address domain allocated to each of the VMM, the guest operating system kernel and the application. FIG. 4 illustrates 32-bit virtual addressing, for example. Referring to FIG. 4, a virtual memory space is set to 0xFFFF FFFF through 0x0000 0000. A VMM domain D0 allocated to the VMM is set to 0xFFFF FFFF through 0xFC00 0000, a VM kernel domain D1 allocated to the guest operating system kernel is set to 0xC080 0000 through 0xC000 0000, and a VM user domain D2 allocated to the application is set to 0xC0000 0000 through 0x0000 0000.

The page table maps a virtual address to a physical address. A page is the smallest unit of virtual addressing. In the case of 32-bit addressing, for example, the page corresponds to a 4 KB virtual memory space. A physical address connected with a certain page designated by a virtual address is referred to as a frame, and a single frame generally has a size of 4 KB. That is, the page table is a mapping table between a page and a frame.

Virtual addressing is a technique that programs a plurality of devices respectively having different physical addressing characteristics on the assumption that there is a common virtual addressing space without having to reprogram memory control within the plurality of devices. Processes executed on a VM are based on virtual addresses, and a processor can write data or codes to a substantial physical address obtained through the page table or read data or codes from the physical address.

When an instruction code accesses a substantial address while being executed irrespective of the current execution mode of the processor, a virtual address must be mapped to the substantial address through the page table. Accordingly, it is possible to prevent a process executed in the VM user mode corresponding to the unprivileged mode from accessing a VM kernel domain allocated to a guest operating system kernel by appropriately controlling address mapping through the page table according to a virtualization mode type.

Memory access permission according to three virtualization modes, that is, the VMM mode, VM kernel mode and VM user mode, will now be explained in detail.

If a process that is currently being executed by a processor is a VMM, that is, in the VMM mode, the VMM must be able to read and write data from and to all the VMM domain, the VM kernel domain and the VM user domain. If the process that is currently being executed by the processor is a guest operating system kernel, that is, in the VM kernel mode, while the guest operating system kernel is prevented from accessing the VMM domain, the guest operating system kernel is permitted to read data from a memory domain shared by the VMM and the guest operating system kernel, such as a domain with respect to an input/output interface between a VM and a physical device. Furthermore, the guest operating system kernel should be permitted to read and write data from and to the VM kernel domain and permitted to only read data from a domain such as a page table used by the guest operating system kernel. In addition, the guest operating system kernel must be allowed to read and write data from and to the VM user domain.

If the process that is currently being executed by the processor is an application, that is, in the VM user mode, the application is not permitted to access the VMM domain and the VM kernel domain and the application is permitted to read and write data from and to only the VM user domain.

To apply the aforementioned rule to the processor only having the privileged mode and the unprivileged mode, a memory space is divided into the VMM domain, the VM kernel domain and the VM user domain and access permissions to the page table is assigned as follows.

Data can be read from and written to the VMM domain in the privileged mode, and an access to the VMM domain is not permitted in the unprivileged mode. However, data can be read from a memory domain shared by the VMM and the guest operating system kernel even in the unprivileged mode. Data can be read and written from and to the VM kernel domain in both the privileged mode and the unprivileged mode. However, data can only be read from a domain such as a page table used by the guest operating system kernel in the unprivileged mode. Data can be read from and written to the VM user domain in both the privileged mode and the unprivileged mode all the time.

Referring back to FIG. 4, read and write are permitted for a domain D0 in the privileged mode, while access to the domain D0 is not allowed in general in the unprivileged mode, only a read operation is permitted for a part of the domain D0 in the unprivileged mode. Read and write are allowed for a domain D1 in the privileged mode, and read and write are permitted for the domain D1 in the unprivileged mode. However, only read is allowed for a page table in the unprivileged mode. Read and write are permitted for a domain 2 D2 in both the privileged mode and the unprivileged mode.

If accesses to the respective memory domains can be controlled, as described above, virtualization having the VMM mode, the VM kernel mode, and the VM user mode can be implemented in the processor only having the privileged mode and the unprivileged mode.

Memory access control for each memory domain is not set according to an execution mode. Rather, memory access control is set according to conversion of three virtualization modes of a virtualization environment. The memory access control for each memory domain is performed prior to page table access control. That is, the memory domain access control and the page table access control can be sequentially applied to obtain access permission results for the respective virtualization modes for the memory domains.

Table 1 represents settings for controlling memory domain access, settings for controlling page table access, and a memory domain access permission state according to the access control when a process that is currently being executed by a processor is a VMM, that is, in the VMM mode.

TABLE 1

| Memory domain | VMM domain | VM kernel domain | VM user domain |
|---|---|---|---|
| Memory domain access control | Conform to page table access set state | Conform to page table access set state | Conform to page table access set state |
| Page table access control | Privileged mode: read and write are permitted Unprivileged mode: no access, only read is | Privileged mode: read and write are permitted Unprivileged mode: no access, only read is | Privileged mode: read and write are permitted Unprivileged mode: read and |

TABLE 1-continued

| Memory domain | VMM domain | VM kernel domain | VM user domain |
|---|---|---|---|
| | permitted for a part of the domain | permitted for a part of the domain | write are permitted |
| Memory domain access permission state | Read and write are both permitted | Read and write are both permitted | Read and write are both permitted |

Referring to Table 1, in the VMM mode, memory domain access is set according to a page table access set state or bypassed. Accordingly, an access to each memory domain is determined according to a page table access set state. Hence, the processor is operated in the privileged mode, and thus, a set state corresponding to the privileged mode from among page table access set states is applied. Consequently, the VMM is permitted to read and write data from and to all the memory domains in the VMM mode.

Table 2 represents settings for controlling memory domain access, settings for controlling page table access, and a memory domain access permission state according to the access control when the process that is currently being executed by the processor is a guest operating system kernel, that is, in the VM kernel mode.

TABLE 2

| Memory domain | VMM domain | VM kernel domain | VM user domain |
|---|---|---|---|
| Memory domain access control | Conform to page table access set state | Conform to page table access set state | Conform to page table access set state |
| Page table access control | Privileged mode: read and write are permitted Unprivileged mode: no access, only read is permitted for a part of the domain | Privileged mode: read and write are not permitted Unprivileged mode: access is permitted, only read is permitted for a part of the domain | Privileged mode: read and write are permitted Unprivileged mode: read and write are permitted |
| Memory domain access permission state | Read and write are not permitted, only read is permitted for a part of the domain | Read and write are both permitted, only read is permitted for a part of the domain | Read and write are both permitted |

Referring to Table 2, in the VM kernel mode, memory domain access is set according to a page table access set state or bypassed. Accordingly, an access to each memory domain is determined according to a page table access set state. Hence, the processor is operated in the unprivileged mode, and thus, a set state corresponding to the unprivileged mode from among page table access set states is applied. Consequently, the guest operating system kernel is not permitted to read and write data from and to the VMM domain while being allowed to only read data from a part of the VMM domain, and the guest operating system kernel is permitted to read and write data from and to the VM kernel domain while being allowed to only read data from a part of the VM kernel domain in the VM kernel mode. In addition, the guest operating system kernel is permitted to read and write data from and to the VM user domain in the VM kernel mode.

Table 3 represents settings for controlling memory domain access, settings for controlling page table access, and memory domain access permission state according to the access control when the process that is currently being executed by the processor is an application, that is, in the VM user mode.

TABLE 3

| Memory domain | VMM domain | VM kernel domain | VM user domain |
|---|---|---|---|
| Memory domain access control | No access | No access | Conform to page table access set state |
| Page table access control | Privileged mode: read and write are permitted Unprivileged mode: no access, only read is permitted for a part of the domain | Privileged mode: read and write are not permitted Unprivileged mode: access is permitted, only read is permitted for a part of the domain | Privileged mode: read and write are permitted Unprivileged mode: read and write are permitted |
| Memory domain access permission state | Read and write are not permitted | Read and write are not permitted | Read and write are both permitted |

Referring to Table 3, in the VM user mode, accesses to the VM monitor domain and the VM kernel domain are not permitted, and an access to the VM user domain is set according to a page table access set state or bypassed. Hence, the processor is operated in the unprivileged mode, and thus, a set state corresponding to the unprivileged mode from among page table access set states is applied to the VM user domain. Consequently, the application is not permitted to read and write data from and to the VMM domain and the VM kernel domain and is permitted to read and write data from and to the VM user domain in the VM user mode.

As described above, the virtualization environment having the VMM mode, the VM kernel mode and the VM user mode can be implemented in the processor only having the privileged mode and the unprivileged mode and, simultaneously, the application can be prevented from accessing the VM kernel domain.

Referring to Tables 1, 2 and 3, when a process executed by the processor is converted into another process, that is, when a virtualization mode is changed, except for conversion between the VM monitor mode and the VM kernel mode and conversion between the VM monitor mode and the VM user mode, there is no need to change the memory domain access set state. Furthermore, the page table access set state is maintained irrespective of conversion of virtualization modes.

Table 4 combines Tables 1, 2 and 3.

TABLE 4

| Memory domain | VMM domain | VM kernel domain | VM user domain |
|---|---|---|---|
| Memory domain access control | VMM mode or VM kernel mode: conform to page table access set state VM user mode: no access | | VMM mode, VM kernel mode, VM user mode: Conform to page table access set state |
| Page table access control | Privileged mode: read and write are permitted Unprivileged mode: no access, only read is permitted for a | Privileged mode: read and write are permitted Unprivileged mode: access is permitted, only read is permitted | Privileged mode: read and write are permitted Unprivileged mode: read and write are |

TABLE 4-continued

| Memory domain | VMM domain | VM kernel domain | VM user domain |
|---|---|---|---|
| | part of the domain | for a part of the domain | permitted |
| Memory domain access permission state | VMM mode: read and write are permitted VM kernel mode: read and write are not permitted, read and write are permitted for a part of the domain VM user mode: read and write are not permitted | VMM mode: read and write are permitted VM kernel mode: read and write are permitted, only read is permitted for a part of the domain VM user mode: read and write are not permitted | VMM mode: read and write are permitted VM kernel mode: read and write are permitted VM user mode: read and write are permitted |

Referring to Table 4, it can be determined whether a specific memory domain can be accessed in each virtualization mode with reference to the memory domain access set state and the page table access set state. The processor can control an access of the currently executed process to the memory domains according to the determination result. According to an exemplary embodiment of the present invention, a minimum privilege level capable of accessing a segment can be set to an x86 segment descriptor describing information of segments, and the page table access control set state can be overloaded to a domain corresponding to a memory domain defined to have individual access permission through domain access control of an Advanced RISC Machine 9 (ARM9) processor.

Consequently, an access to each memory domain is set according to a process that is currently being executed by the processor, that is, according to the VMM mode, the VM kernel mode, and the VM user mode, and an access to each page is set in the page table according to the privileged mode and the unprivileged mode of the processor.

A memory domain access set state can be changed by a VMM. For example, when the VM user mode is converted to the VMM mode, the VMM can adapt the memory domain access set state to the VMM mode right after the VM user mode is converted to the VMM mode. If the VMM mode is converted to the VM user mode, the VMM can change the memory domain access set state right before the VMM mode is changed to the VM user mode. If the VM kernel mode is converted to the VM user mode or if the VM user mode is converted to the VM kernel mode, the VMM can change the memory domain access set state right before or right after the mode conversion when the VM kernel hypercalls a corresponding function of the VMM.

The page table access set state is not required to be changed, and the memory domain access set state is also not required to be changed except for the aforementioned cases, and thus, overhead in terms of performance caused by a variation in access set states is low. Furthermore, a conventional VMM and guest operating system kernel can be used because the conventional VMM and the guest operating system kernel are not required to be corrected except for memory domain access setting and variations.

Most processors using virtual addresses have a memory management unit (MMU) for supporting address translation in a hardware manner. The MMU includes a translation lookaside buffer (TLB) that is a cache temporarily storing an address that is frequently referred to. Recently accessed memory pages can be accessed again in the near future, and thus, correspondence between a virtual page and a physical page is stored in the TLB when address translation tables are used to translate a virtual page descriptor into a physical page position.

Whenever address translation is required, the TLB is checked in order to determine whether the TLB caches the mapping with respect to a page where a memory unit is located. If the TLB caches the mapping, a cache copy is used. If the TLB does not cache the mapping, a corresponding address is translated from translation tables. Since accessing the TLB is faster than accessing the translation tables in a memory, utilization of the TLB improves the performance when continuous memory accesses are located in pages in the same group.

The configuration of the page table depends on the type of VM and a user process executed in the same VM. When the page table is changed, the contents of the TLB in the processor must be updated so that performance can be reduced. Accordingly, the operation of the TLB should be optimized. That is, a variation in the contents of the TLB is prevented even when the page table is changed to restrain a deterioration in performance.

A code required to have a high hit rate because the code is frequently used is referred to as a hot spot. In an exemplary embodiment of the present invention, hot spots of the VMM and the guest operating system kernel are selected and profiled. In the case of the VMM, an exception code, a hardware interrupt handling code, a software interrupt handling code, a return code to the unprivileged mode, and a scheduling code can be selected as hot spots. In the case of the guest operating system kernel, an event handling code from a VMM, a system call interface code from an application, and a scheduling code can be selected as hot spots.

While the hot spots of the VMM and the hot spots of the guest operating system kernel can be respectively arranged in different pages, the hot spots of the VMM and the hot spots of the guest operating system kernel are continuously arranged and coded to construct a minimum number of pages in an exemplary embodiment of the present invention. A page can have a size capable of storing all the hot spots. Furthermore, the VMM is set such that the VMM can recognize virtual memory addresses of the hot spots of the guest operating system kernel.

After the system is initialized, the hot spots of the VMM are fixed to the TLB. The VMM fixes the hot spots of the guest operating system kernel of the VM to the TLB while loading the guest operating system kernel.

When the VM is changed to a new VM, the VMM invalidates the hot spots of the guest operating system kernel of the old VM stored in the TLB, and fixes hot spots of the guest operating system kernel of the new VM to the TLB.

Figure 5:
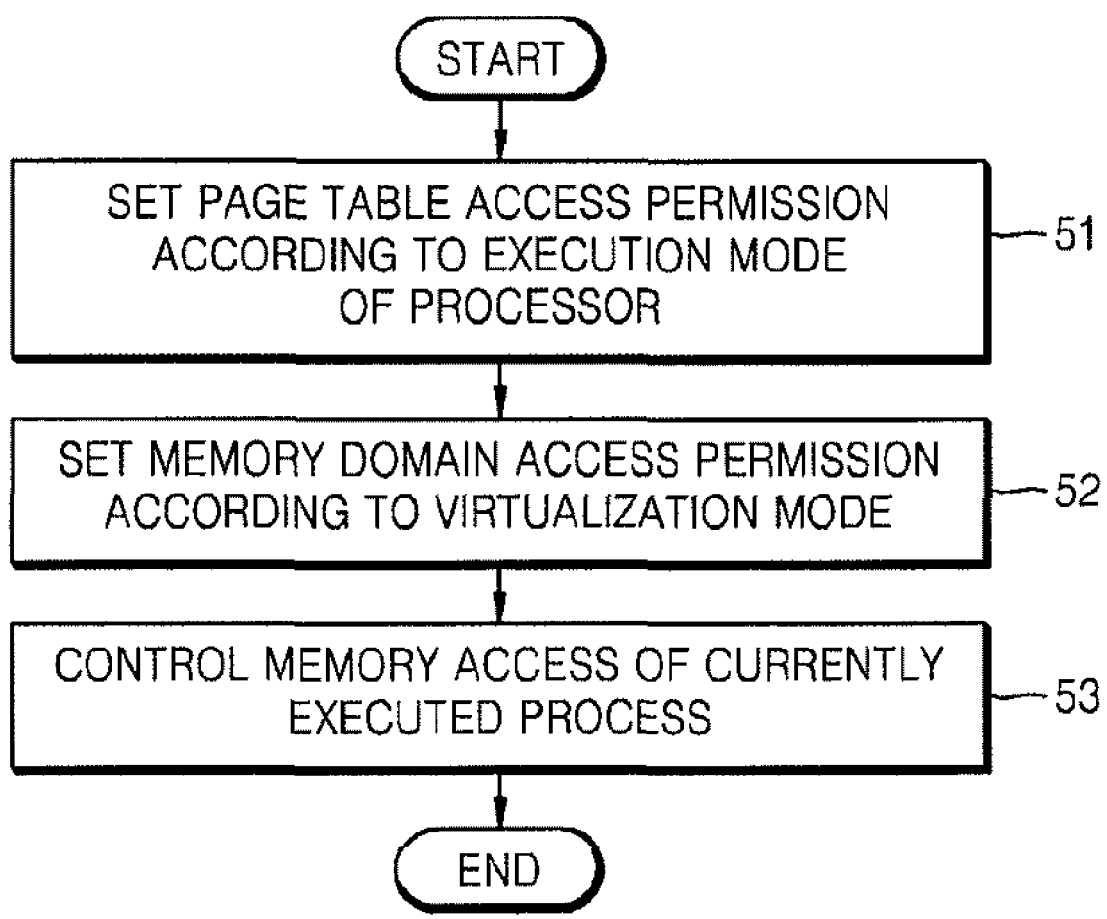
FIG. 5 is a flow chart of a method of controlling memory access according to an exemplary embodiment of the present invention.

FIG. 5 is a flow chart of a method of controlling memory access according to an exemplary embodiment of the present invention. Referring to FIG. 5, a page table maps a virtual address to a physical address, and sets whether a memory is accessible for each page according to the execution mode of a processor in operation 51. The processor can have a privileged mode and an unprivileged mode. Access permissions according to the privileged mode and the unprivileged mode are set for each page and stored in the page table. The privileged mode has a first priority for the entire domain of the memory and the unprivileged mode has a second priority for a part of the memory. When a page is a predetermined address space unit, whether the memory is accessible can be set for another address space unit.

Whether the memory is accessible is set for each of the memory domains according to a process that is currently being executed by the processor in operation 52. In other words, whether the memory is accessible according to a virtualization mode is set for each memory domain. When the processor has the privileged mode and the unprivileged mode, it can have three virtualization modes when a virtualization technique is applied thereto. Specifically, the processor can have a VMM mode corresponding to the privileged mode in which a VMM is executed, a VM kernel mode corresponding to the unprivileged mode in which a guest operating system kernel is executed, and a VM user mode corresponding to the unprivileged mode in which an application is executed. In this case, memory access permissions can be set for each of the virtualization modes.

An access of the processor to the memory is controlled according to a set page and a memory domain unit in operation 53. Accordingly, if an application is executed in the unprivileged mode, the application is prevented from accessing a memory domain allocated to a guest operating system kernel operating in the unprivileged mode.

The present invention can also be embodied as computer readable code on a computer readable recording medium. The computer readable recording medium is any data storage device that can store data that can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by one of ordinary skill in the art that various changes in form and details may be made therein without departing from the spirit and scope of the present invention as defined by the following claims.

As described above, the method and apparatus for controlling memory access according to exemplary embodiments of the present invention can control memory access for each memory domain and each page to effectively protect a memory domain allocated to a guest operating system executed in an unprivileged mode of a processor from an application executed in the unprivileged mode. Furthermore, a virtual machine system according to exemplary embodiments of the present invention can be implemented in the existing hardware structure without changing the existing hardware structure and the existing VMM and VM kernel can be used without any change.

What is claimed is:

1. A system including a first layer element executed in a privileged mode having a first permission to access an entire region of a memory and second and third layer elements executed in an unprivileged mode having a second permission to access a partial region of the memory, the system comprising:
   the memory; and
   a processor which determines whether the memory is accessible for each page that is an address space unit in the memory, based on which mode a layer element currently accessing the memory is executed in between the privileged mode and the unprivileged mode, which provides the memory comprising a plurality of domains, a first domain among the plurality of domains being allocated to the first layer element, a second domain being allocated to the second layer element, and a third domain being allocated to the third layer element, and which determines whether each of the plurality of domains of the memory is accessible based on which one of the first, second and third layer elements corresponds to a domain that is currently being accessed from among a plurality of domains of the memory, wherein at least the second domain is different from the third domain,
   wherein the first layer element is a virtual machine monitor (VMM) interfacing hardware of the system to at least one guest operating system kernel, the second layer element is the at least one guest operating system kernel, and the third layer element includes at least one application.

2. The system of claim 1, wherein the processor sets a page table that maps a virtual address to a physical address for each page to permit the VMM to access the first domain to which the VMM is allocated, the second domain to which the at least one guest operating system kernel is allocated, and the third domain to which the application is allocated if the VMM currently attempts to access the memory, and to disallow the at least one guest operating system kernel or the at least one application to access all of the first domain, and allow the at least one guest operating system kernel or the at least one application to access at least one of the second and third domains if the at least one guest operating system kernel or the at least one application currently attempts to access the memory.

3. The system of claim 2, wherein the processor sets the page table such that the at least one guest operating system kernel is permitted to only read data from a specific region of the first domain, which is shared by the VMM and the at least one guest operating system kernel.

4. The system of claim 2, wherein the processor sets the page table such that the at least one guest operating system kernel is permitted to only read data from a specific region of the second domain, in which the page table is stored.

5. The system of claim 2, wherein the processor sets memory accessibility for each of the plurality of the domains of the memory to permit the VMM or the at least one guest operating system kernel to access the memory according to the set page table if the VMM or the at least one guest operating system kernel attempt to access the memory, to disallow the at least one application to access the first and second domains if the at least one application attempts to access the memory, and to allow the at least one application to access the third domain.

6. The system of claim 5, wherein the VMM updates the setting of memory accessibility for each of the plurality of the domains of the memory if a layer element that is currently attempting to access the memory is changed from the VMM to the at least one application or is changed from the at least one application to the VMM, the VMM being hypercalled by the at least one guest operating system kernel which then updates the setting of memory accessibility for the each domain if the layer element that is currently attempting to access the memory is changed from the at least one guest operating system kernel to the at least one application or is changed from the at least one application to the at least one guest operating system kernel.

7. The system of claim 1, further comprising:
   a translation lookaside buffer which caches virtual addresses and stores hot spots selected from codes of the VMM or the at least one guest operating system kernel.

8. The system of claim 1, wherein the processor determines whether each of the plurality of domains of the memory is accessible based on which one of the first, second, and third layer elements corresponds to the domain that is currently being accessed prior to determining whether the memory is accessible for each page that is the address space unit in the memory, based on which mode the layer element currently accessing the memory is executed in between the privileged mode and the unprivileged mode.

9. A method of controlling memory access in a system including a first layer element executed in a privileged mode having a first permission to access an entire region of a memory and second and third layer elements executed in an unprivileged mode having a second permission to access a partial region of the memory, the method comprising:
 determining, using a processor, whether the memory is accessible for each page that is an address space unit in the memory, based on which mode a layer element currently accessing the memory is executed in between the privileged mode and the unprivileged mode;
 providing the memory comprising a plurality of domains, a first domain among the plurality of domains being allocated to the first layer element, a second domain being allocated to the second layer element, and a third domain being allocated to the third layer element, wherein at least the second domain is different from the third domain; and
 determining whether each of the plurality of domains of the memory is accessible based on which one of the first, second and third layer elements corresponds to a domain currently being attempted to be accessed from among the plurality of domains of the memory,
 wherein the first layer element is a virtual machine monitor (VMM) interfacing hardware of the system to at least one guest operating system kernel, the second layer element is the at least one guest operating system kernel, and the third layer element includes at least one application.

10. The method of claim 9, wherein the determining whether the memory is accessible for each page comprises setting a page table that maps a virtual address to a physical address for each page to permit the VMM to access the first domain to which the VMM is allocated, the second domain to which the at least one guest operating system kernel is allocated, and the third domain to which the application is allocated if the VMM currently attempts to access the memory, and to disallow the at least one guest operating system kernel or the at least one application to access all of the first domain and allow the at least one guest operating system kernel or the at least one application to access at least one of the second and third domains if the at least one guest operating system kernel or the at least one application attempts to access the memory.

11. The method of claim 10, wherein the determining whether the memory is accessible for each page comprises setting the page table such that the at least one guest operating system kernel is permitted to only read data from a specific domain of the first domain, which is shared by the VMM and the at least one guest operating system kernel.

12. The method of claim 10, wherein the determining whether the memory is accessible for each page comprises setting the page table such that the at least one guest operating system kernel is permitted to only read data from a specific region of the second domain, in which the page table is stored.

13. The method of claim 10, wherein the determining of whether the memory is accessible according to which one of the first, second and third layer elements corresponds to the domain currently being attempted to be accessed from among the plurality of domains of the memory comprises setting memory accessibility for each of the plurality of the domains of the memory to permit the VMM or the at least one guest operating system kernel to access the memory according to the set page table if the VMM or the at least one guest operating system kernel attempts to access the memory, to disallow the at least one application to access the first and second domains if the at least one application attempts to access the memory, and to allow the at least one application to access the third domain.

14. The method of claim 13, further comprising:
 updating, by the VMM, of the setting of memory accessibility for each of the plurality of the domains of the memory if a layer element that is currently attempting to access the memory is changed from the VMM to the application or is changed from the application to the VMM; and
 hypercalling, by the at least one guest operating system kernel, of the VMM and then the VMM updating the setting of memory accessibility for the each domain if the layer element that is currently attempting to access the memory is changed from the at least one guest operating system kernel to the at least one application or is changed from the at least one application to the at least one guest operating system kernel.

15. The method of claim 9, wherein the system comprises a translation lookaside buffer caching virtual addresses, and the method further comprises storing hot spots selected from codes of the VMM or the at least one guest operating system kernel in the translation lookaside buffer.

16. The method of claim 15, wherein the storing the hot spots comprises storing the hot spots in the translation lookaside buffer such that virtual addresses of the hot spots are continuous.

17. The method of claim 15, further comprising:
 updating the hot spots stored in the translation lookaside buffer if a virtual machine is changed to another virtual machine.

18. The method of claim 9, wherein the determining whether each of the plurality of domains of the memory is accessible based on which one of the first, second, and third layer elements corresponds to the domain currently being attempted to be accessed is performed prior to the determining whether the memory is accessible for each page that is the address space unit in the memory, based on which mode the layer element currently accessing the memory is executed in between the privileged mode and the unprivileged mode.

19. A non-transitory computer readable storage medium storing a program for executing a method of controlling memory access in a system including a first layer element executed in a privileged mode having a first permission to access an entire region of a memory and second and third layer elements executed in an unprivileged mode having a second permission to access a partial region of the memory, the method comprising,
 determining whether the memory is accessible for each page that is an address space unit in the memory, based on which mode a layer element currently accessing the memory is executed in between the privileged mode and the unprivileged mode;
 providing the memory comprising a plurality of domains, a first domain among the plurality of domains being allocated to the first layer element, a second domain being allocated to the second layer element, and a third domain being allocated to the third layer element, wherein at least the second domain is different from the third domain; and
 determining whether each of the plurality of domains of the memory is accessible based on which one of the first, second and third layer elements corresponds to a domain currently being attempted to be accessed from among the plurality of domains of the memory, wherein the first layer element is a virtual machine monitor (VMM) interfacing hardware of the system to at least one guest operating system kernel, the second layer element is the at least one guest operating system kernel, and the third layer element includes at least one application.

20. The computer readable storage medium of claim 19, wherein the determining whether each of the plurality of domains of the memory is accessible based on which one of the first, second, and third layer elements corresponds to the domain currently being attempted to be accessed is performed prior to the determining whether the memory is accessible for each page that is the address space unit in the memory, based on which mode the layer element currently accessing the memory is executed in between the privileged mode and the unprivileged mode.

* * * * *